United States Patent [19]
Boldt et al.

[11] 4,006,300
[45] Feb. 1, 1977

[54] TWO-PIECE BACK FOR A CONSOLE TELEVISION RECEIVER

[75] Inventors: Melvin H. Boldt, Glenview; David P. Chuboff, North Barrington; Robert W. Becker, Naperville, all of Ill.

[73] Assignee: Zenith Radio Corporation, Chicago, Ill.

[22] Filed: Dec. 31, 1975

[21] Appl. No.: 645,489

[52] U.S. Cl. .............................. 358/254; 312/7 TV
[51] Int. Cl.² ......................................... H01J 29/02
[58] Field of Search ................... 178/7.9; 312/7 TV

[56] References Cited

UNITED STATES PATENTS

| | | | |
|---|---|---|---|
| 2,826,755 | 3/1958 | Aiken | 178/7.9 |
| 3,087,013 | 4/1963 | Stastny et al. | 178/7.9 |

*Primary Examiner*—Richard Murray
*Attorney, Agent, or Firm*—Nicholas A. Camasto

[57] ABSTRACT

A two-piece back for an ultra-modern style console television receiver cabinet has a molded plastic inner portion riveted to a formed plastic outer portion. The molded inner portion is identical to backs used on other, generally smaller, portable type television receivers in the manufacturer's line.

7 Claims, 6 Drawing Figures

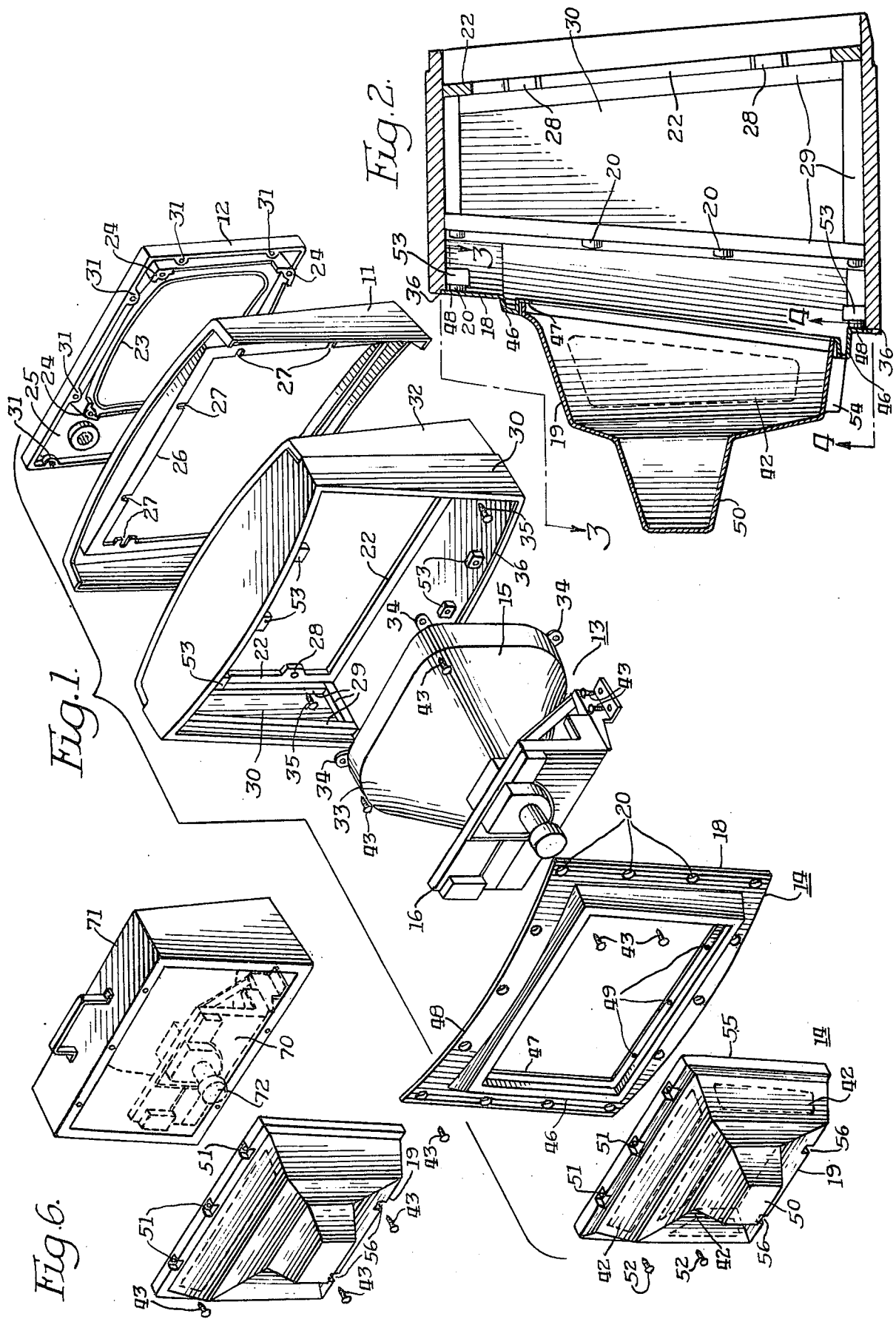

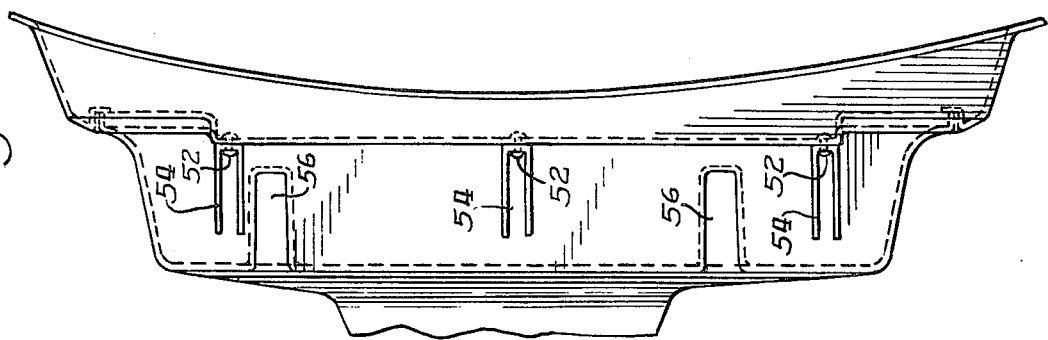
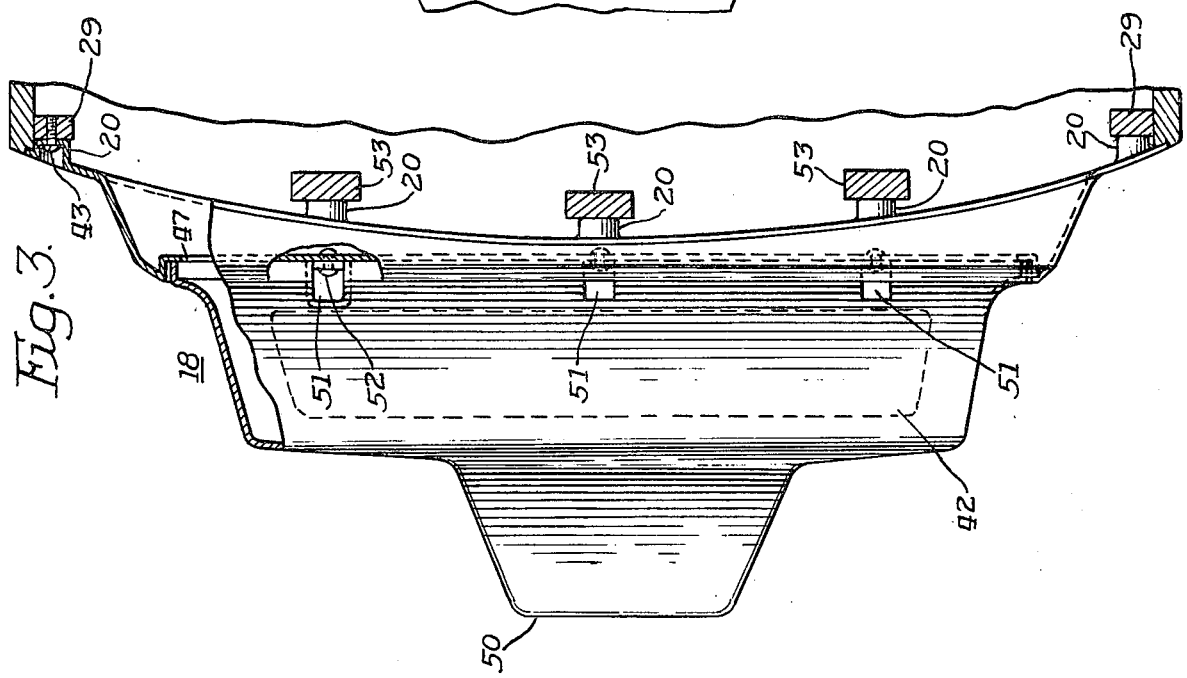
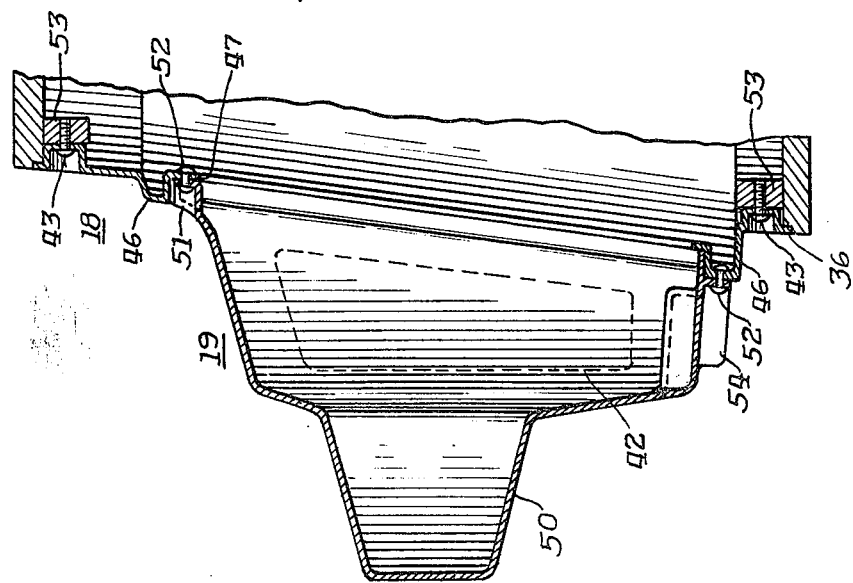

TWO-PIECE BACK FOR A CONSOLE TELEVISION RECEIVER

CROSS REFERENCE OF RELATED APPLICATION

The subject matter of this application is related to, but not dependent upon, the invention disclosed and claimed in application Ser. No. 632,350, filed Nov. 14, 1975, in the name of Melvin H. Boldt et al, entitled TELEVISION RECEIVER CABINET WITH FORMED DECORATIVE FRONT, and assigned to Zenith Radio Corporation.

BACKGROUND OF THE INVENTION

This invention relates generally to television receiver cabinets and specifically to the backs for such cabinets. The growth of television viewing over the years has resulted in a proliferation of television receiver sizes and styles to meet the needs of the viewing public. Assuming a fixed total market volume and a fixed market share as the number of different receiver models in a manufacturer's product line increases, the percentage of sales of any particular model generally decreases. This is generally true for any mass produced product. Simply stated, economic disadvantages are incurred in producing a large variety of models. Consequently, manufacturers try to standardize on component parts and hardware as much as possible.

In the aforementioned copending application, the economics of providing relatively limited quantities of ultramodern style console receivers is discussed. An attractive partial solution is provided by that invention which involves fabricating a major part of the cabinet of formed, rather than molded plastic. The part (a decorative cabinet front) contributes greatly to the esthetic appeal of the receiver and is producible with relatively low tooling costs. (The advantages of formed plastics over molded plastics is primarily in tooling cost and tooling time.) Thus, for a small manufacturer, or for a large manufacturer with an extensive product line, the advantages of vacuum or thermal forming of television receiver cabinet parts may be considerable.

Normally the back of the television receiver is unimportant from an esthetic point of view, since it is rarely exposed to view. Ultra-modern receivers, on the other hand, often present a substantial portion of the receiver back to view and these backs are designed as tastefully as possible, while enabling them to perform their primary functions of enclosing the receiver and providing ventilation.

Television receiver plastic backs, as contrasted with picture tube escutcheons, are generally limited to portable type receivers with all-plastic cabinets having few, if any, separate structural members. The backs are molded, because they must play a structural role in the receiver cabinet and include a plurality of ventilating apertures, the size and position of which must be accurately controlled, to conform to various safety criteria. Since forming the back from a sheet of plastic would necessitate an expensive milling operation to produce these ventilating apertures as well as require additional structural support members, molded parts are almost universally used.

In console receivers, the backs are generally made of pressed board or the like. In ultra-modern style consoles, often having many curved free flowing lines, the pressed board would be exposed to view and not be suitable. Thus a partially decorative back for such a receiver would be of molded plastic.

To offset the dual drawbacks of high tooling cost and low volume in such ultra-modern style receivers, the present invention utilizes a two piece cabinet back. The center portion is preferably a molded plastic back used in large quantities for one or more popular portable television receiver in the manufacturer's line and the outer portion is a low cost formed piece for extending the closure area of the molded portion, preferably in a contoured manner. Thus a large screen ultramodern style receiver may use a conventional molded back from a smaller or similar size receiver with a formed, outer section contoured as desired,

OBJECTS OF THE INVENTION

A primary object of this invention is to provide a novel back for a console television receiver.

Another object of this invention is to provide a plastic cabinet back for a television receiver which affords substantial economic benefit.

SUMMARY OF THE INVENTION

In accordance with the invention a television cabinet back includes a molded central portion with a substantially rectangular peripheral section adapted to enclose a first receiver cabinet of similar dimension and an end bell section for enclosing the neck of an extending picture tube and chassis parts; a formed portion including a rectangular outer edge for enclosing a second receiver cabinet of greater dimensions and an inner edge in engagement with the outer edge of said molded portion; and fastening means joining said molded and formed portions.

BRIEF DESCRIPTION OF THE DRAWINGS

Other objects and advantages of this invention will become apparent upon reading the following specification in conjunction with the drawings in which:

FIG. 1 is an exploded perspective view of a television receiver having a back constructed in accordance with the invention;

FIG. 2 is a cross section of the cabinet shell and back of FIG. 1;

FIG. 3 is an enlarged partial sectional view taken along the line 3—3 of FIG. 2;

FIG. 4 is an enlarged view of a portion of the receiver of FIG. 2 taken along the line 4—4;

FIG. 5 is an enlarged partial view through the middle of the receiver of FIG. 2; and FIG. 6 is a perspective showing the use of the center portion of the back with a different receiver.

DESCRIPTION OF THE PREFERRED EMBODIMENT

In FIG. 1 a cabinet shell 10 includes a top, a bottom and a pair of side walls. A front frame 22 is provided in the frontal opening of cabinet shell 10 and a plurality of side braces 29 are mounted in supportive relationship with each side wall and the top and bottom. Front frame 22 includes a number of support points 28, only one of which is shown in FIG. 1, for mounting a conventional picture tube escutcheon 12. It will be appreciated that cabinet shell 10 may be constructed in a variety of ways from a variety of materials. For purposes of this invention cabinet shell 10 is of sufficiently rigid construction to support the bulk of the television receiver weight. Also front frame 22 is preferably made of a solid structural material such as wood. The exterior surfaces of cabinet shell 10 may be painted, stained or otherwise finished. The bottom of cabinet shell 10 should have suitable ventilation apertures formed therein.

The front edges of the top and bottom and a substantial portion of the side walls of the cabinet shell are rabbetted to provide circumferential support surfaces disposed about the frontal portion of the cabinet. As set out clearly in the copending application mentioned above, the support surfaces are not finished and, indeed, may advantageously have a roughened surface for better glue adhesion. The back edge of the shell includes a circumferential lip 36 for flush mounting of a back.

A decorative front 11, formed of plastic material, has a cutout 26 slightly larger than the opening defined by the front frame but smaller than the outer dimensions of the escutcheon. A plurality of mounting holes 27 is provided in cutout 26 for cooperation with support points 28 in the cabinet shell. The decorative front has a bottom portion, side portions and a top portion for cooperative engagement with the corresponding support surfaces of the cabinet shell.

Escutcheon 12 is conventional and includes a generally rectangular picture tube opening or window 23, four picture tube mounts 24, located at the diagonals of the window, and a panel section 25. It may be fabricated of die cast metal, or molded plastic with suitable strengthening ribs, and is attachable to the cabinet shell by suitable fasteners such as bolts 35 mounted through the holes in support points 28 and seating in escutcheon mounts 31. Decorative front 11 is "sandwiched" between the cabinet shell and escutcheon when assembled.

A chassis assembly 13 comprises a picture tube 15 and a chassis 16. Picture tube 15 has suitable mounting means thereon such as a conventional tension strap 33, with mounting ears 34 attached, circumferentially surrounding the faceplate of the tube. Mounting ears 34 are secured to picture tube mounts 24 by suitable fasteners 43 for supporting the picture tube from the escutcheon.

A back 14, including a molded inner portion 19 and a formed outer portion 18, is designed to fit into lip 36 in the rear of cabinet shell 10 and is fastened by suitable screw fasteners 43, through fastening holes 20, to a plurality of back mounts 53 located along the top and bottom of the cabinet shell interior, and to the rearward ones of side braces 29. Vent areas 42, indicated by the dashed lines, are provided in the top, bottom and sides of molded portion 19 to permit air circulation. Molded portion 19 includes a raised end bell 50 for enclosing the neck of a picture tube and a generally rectangular peripheral section 55. A plurality of upper mounting recesses 51 are arranged along the top of molded portion 19 and a pair of lower mounting recesses 56 located along the bottom. These latter recesses which may be more clearly seen in FIG. 4, are longer than upper recesses 51 and while they serve no useful purpose in the preferred embodiment, they provide access for mounting molded portion 19 to a different size receiver cabinet.

Formed portion 18 includes a generally rectangular outer edge 48 and a recessed inner edge 47 of slightly larger dimension than peripheral section 55 of molded portion 19. A raised section and plateau 46 is intermediate the inner and outer edges and is graded to match planar peripheral section 55 of molded portion 19 to contoured outer edge 48 of formed portion 18. A plurality of apertures 49 are shown in the bottom part of the lip surrounding inner edge 47. Similar apertures 49 are in the top part of the lip (not shown) and are in alignment with recesses 51.

As shown in detail in FIGS. 2 and 4, three U-shaped feet 54 are formed in the bottom of molded portion 19. While the feet serve no functional purpose in the preferred embodiment, they provide convenient points for attachment of the bottom edge of molded portion 19 to the bottom part of the lip surrounding inner edge 47. A plurality of rivets 52 attach molded portion 19 and formed portion 18 together. The two piece back of the invention represents a cost effective solution to the problem of proliferating television receiver sizes, particularly where the back plays an important role in receiver esthetics. Here, molded portion 19 (which, it will be recalled, requires expensive tooling) is a standard back used on one or more popular size portable television receivers in the manufacturing product line and formed portion 18 enables its use with the particular ultra-modern receiver.

FIG. 2 shows a sectional view of cabinet shell 10 and two piece back 14, when assembled. For purposes of clarity, the picture tube, chassis escutcheon and decorative front are omitted. Fastening holes 20 in formed portion 18 are "cup-shaped" to position the member away from top and bottom back mounts 53 and the rear ones of side braces 29 to permit nesting of outer edge 48 into lip 36 about the rear periphery of cabinet shell 10. One of feet 54 is also shown. As mentioned, feet 54 do not function as support members for the television receiver when molded portion 19 is part of the two piece back, as they do when used without formed portion 18.

FIG. 3 is an enlarged view taken along section line 3—3 in FIG. 2. It clearly discloses the cup configuration of fastening holes 20 in formed portion 18 as well as the three upper back mounts 53 and the top portions of the rearward ones of side braces 29. The upper part of the FIG. is further partially sectioned to show screw fastener 43 seated in the bottom of the cup of fastening hole 20 and mounted to brace 29. Top recesses 51 with rivets 52 affixing molded portion 19 to the lip about inner edge 47 of formed portion 18 are also shown.

FIG. 4 is a bottom view of the two piece back clearly showing lower recesses 56 and U-shaped feet 54, and FIG. 5 is essentially the same as FIG. 2 with a little more detail. Specifically in FIG. 5 rivets 52 are shown in upper mounting recess 51 and a sectioned one of the U-shaped feet 54, and screw fasteners 43 in sectioned upper and lower back mounts 53.

FIG. 6 is a simplified pictorial view of a portable television receiver cabinet 71 housing a different chassis assembly 70 and picture tube 72. Molded portion 19 is seen to serve as an enclosing back for cabinet 71 and is connected to the rear thereof via appropriate screw fasteners 43 in upper recesses 51 and lower recesses 56.

What has been described is a novel two piece television back which incorporates a molded portion identical to those utilized as the backs of other television receivers in the manufacturer's product line and a formed portion to which the molded portion is attached for enclosing the rear of an ultramodern style console receiver.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

What is claimed is:

1. A back for a television receiver comprising:
   a molded central portion including a generally rectangular peripheral section adapted to enclose a first receiver cabinet of similar dimension and an end bell section adapted to enclose the neck of an extending picture tube and assorted chassis parts;
   a formed portion including a generally rectangular outer edge dimensioned to enclose a second receiver cabinet of greater dimension that said first receiver cabinet, and an inner edge in engagement with the outer edge of said molded portion; and
   fastening means joining said molded and formed portions together.

2. A back for a television receiver as set forth in claim 1, wherein said peripheral section and said inner edge define a plurality of aligned apertures;
   said fastening means including a corresponding plurality of connectors positioned in said apertures.

3. A back for a television receiver as set forth in claim 2, wherein said fastening means comprise rivets holding said molded portion and said formed portion together.

4. A back for a television receiver as set forth in claim 2, wherein said formed portion includes a raised plateau defining said inner edge, said raised plateau increasing the distance between said end bell section and said rectangular outer edge for accommodating larger dimension picture tubes.

5. A back for a television receiver as set forth in claim 4, wherein said inner edge is defined by a circumferential recess in said raised plateau; and
   said peripheral section of said molded portion nests within said recess.

6. For use in covering the rear of a television receiver cabinet housing a chassis and a picture tube with a substantial part of the picture tube neck extending beyond the confines of the cabinet, a two-piece back comprising:
   a molded central portion adapted to enclose the extending neck of said picture tube;
   a formed portion defining an inner edge overlapping the periphery of said molded central portion and an outer edge for attachment to said cabinet; and
   means affixing said molded central portion to said formed portion.

7. A two-piece back as set forth in claim 6, wherein said periphery of said molded portion includes a plurality of apertures adapted to mount said formed portion to a receiver cabinet of similar dimension;
   wherein said inner edge of said formed portion includes a plurality of apertures aligned with said first-mentioned apertures; and
   wherein said portions are riveted together at said aligned apertures.

* * * * *